(12) United States Patent
Donmez et al.

(10) Patent No.: US 11,435,017 B2
(45) Date of Patent: Sep. 6, 2022

(54) DEVICE FOR CONNECTING A TUBULAR ELEMENT, A COMBINATION OF A DEVICE WITH A TUBULAR ELEMENT AND A BONDING COMPOUND, AS WELL AS A METHOD FOR CONNECTING THE DEVICE WITH A TUBULAR ELEMENT

(71) Applicant: Eaton Intelligent Power Limited, Dublin (IE)

(72) Inventors: Hasan Barca Donmez, Istanbul (TR); Erhan Aptiogullari, Tekirdag (TR); Recep Muco, Tekirdag (TR); Salih Karayagiz, Silivri-Istanbul (TR)

(73) Assignee: Danfoss Power Solutions II Technology A/S, Nordborg (DK)

( * ) Notice: Subject to any disclaimer, the term of this patent is extended or adjusted under 35 U.S.C. 154(b) by 98 days.

(21) Appl. No.: 16/751,210

(22) Filed: Jan. 24, 2020

(65) Prior Publication Data
US 2020/0240562 A1 Jul. 30, 2020

(30) Foreign Application Priority Data
Jan. 25, 2019 (GB) ..................................... 1901014

(51) Int. Cl.
*F16L 33/34* (2006.01)
*F16L 33/18* (2006.01)
(52) U.S. Cl.
CPC ............... *F16L 33/34* (2013.01); *F16L 33/18* (2013.01)

(58) Field of Classification Search
CPC . F16L 33/34; F16L 33/18; F16L 33/32; F16L 13/10; F16L 13/116
(Continued)

(56) References Cited

U.S. PATENT DOCUMENTS 2,920,910 A * 1/1960 Schnabel ............ F16L 33/2073
285/222.4
3,051,511 A * 8/1962 Fawick .................. F16L 33/18
285/106
(Continued)

FOREIGN PATENT DOCUMENTS

CA 2712760 A1 * 2/2011 ......... B29C 66/5344
CN 101016967 A 8/2007
(Continued)

*Primary Examiner* — James M Hewitt, II
(74) *Attorney, Agent, or Firm* — Leydig, Voit & Mayer, Ltd.

(57) ABSTRACT

A device for connecting a tubular element such as a hose or pipe to a part of a hydraulic or pneumatic system includes: a body having a connection end and a tubular element insertion end, the body having a cylindrical channel extending from the connection end to the tubular element insertion end, the connection end being connecting to the part of the hydraulic or pneumatic system, the cylindrical channel including a first part and a second part, the first part being arranged in the tubular element insertion end and the second part being arranged in the connection end. The tubular element insertion end includes at a middle section a recess extending radially from the first part of the cylindrical channel, along an entire circumference, the recess bordering the second part of the cylindrical channel. The tubular element insertion end includes at least one bore.

8 Claims, 6 Drawing Sheets

(58) Field of Classification Search
USPC .......................................... 285/294.3, 296.1
See application file for complete search history.

(56) References Cited

U.S. PATENT DOCUMENTS

| | | | | |
|---|---|---|---|---|
| 4,605,466 | A | * | 8/1986 | Eisenzimmer .......... F16L 33/34 |
| | | | | 156/293 |
| 4,647,080 | A | | 3/1987 | Happy et al. |
| 4,927,999 | A | * | 5/1990 | Hanselka .............. B29C 66/861 |
| | | | | 219/535 |
| 2013/0043676 | A1 | * | 2/2013 | Baker ............... B29C 45/14614 |
| | | | | 285/286.1 |

FOREIGN PATENT DOCUMENTS

| | | | | |
|---|---|---|---|---|
| DE | 1902520 | A1 | * | 8/1970 |
| GB | 2159902 | A | | 12/1985 |
| JP | 2005256349 | A | | 9/2005 |
| WO | WO-2011023888 | A1 | * | 3/2011 ............ F16J 15/104 |
| WO | WO 2012008371 | A1 | | 1/2012 |

\* cited by examiner

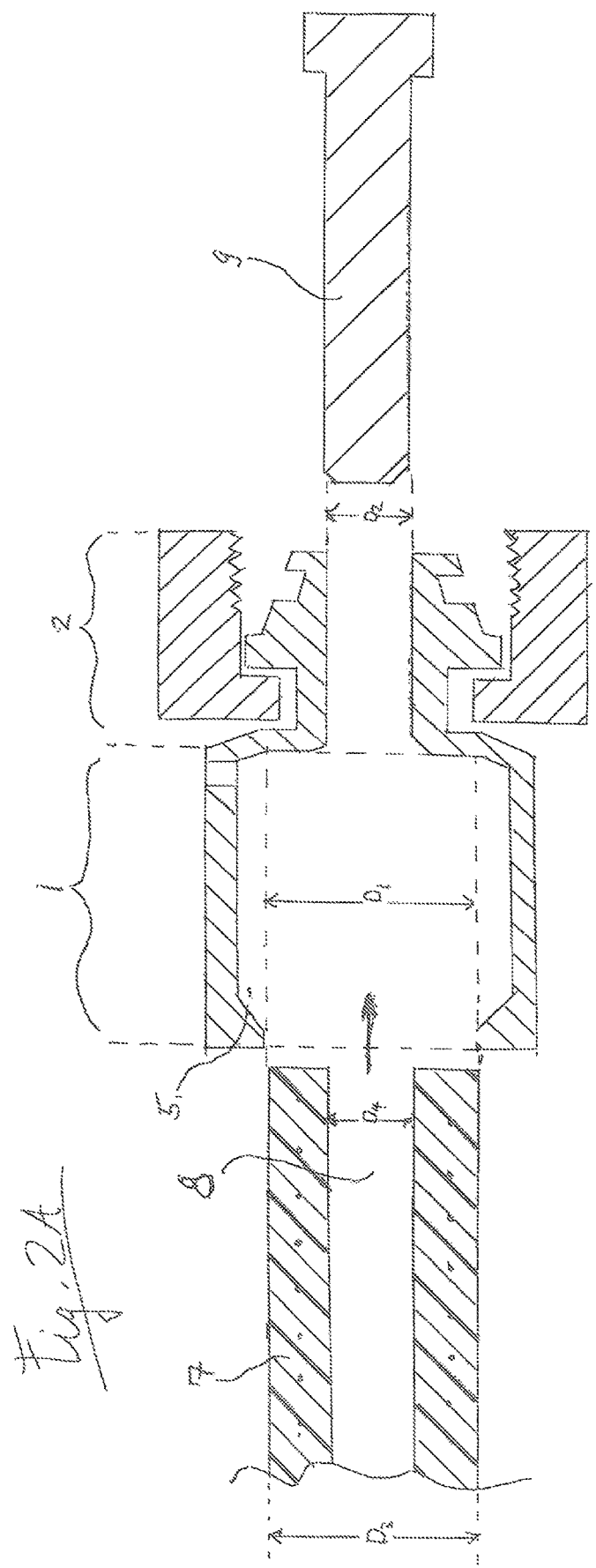

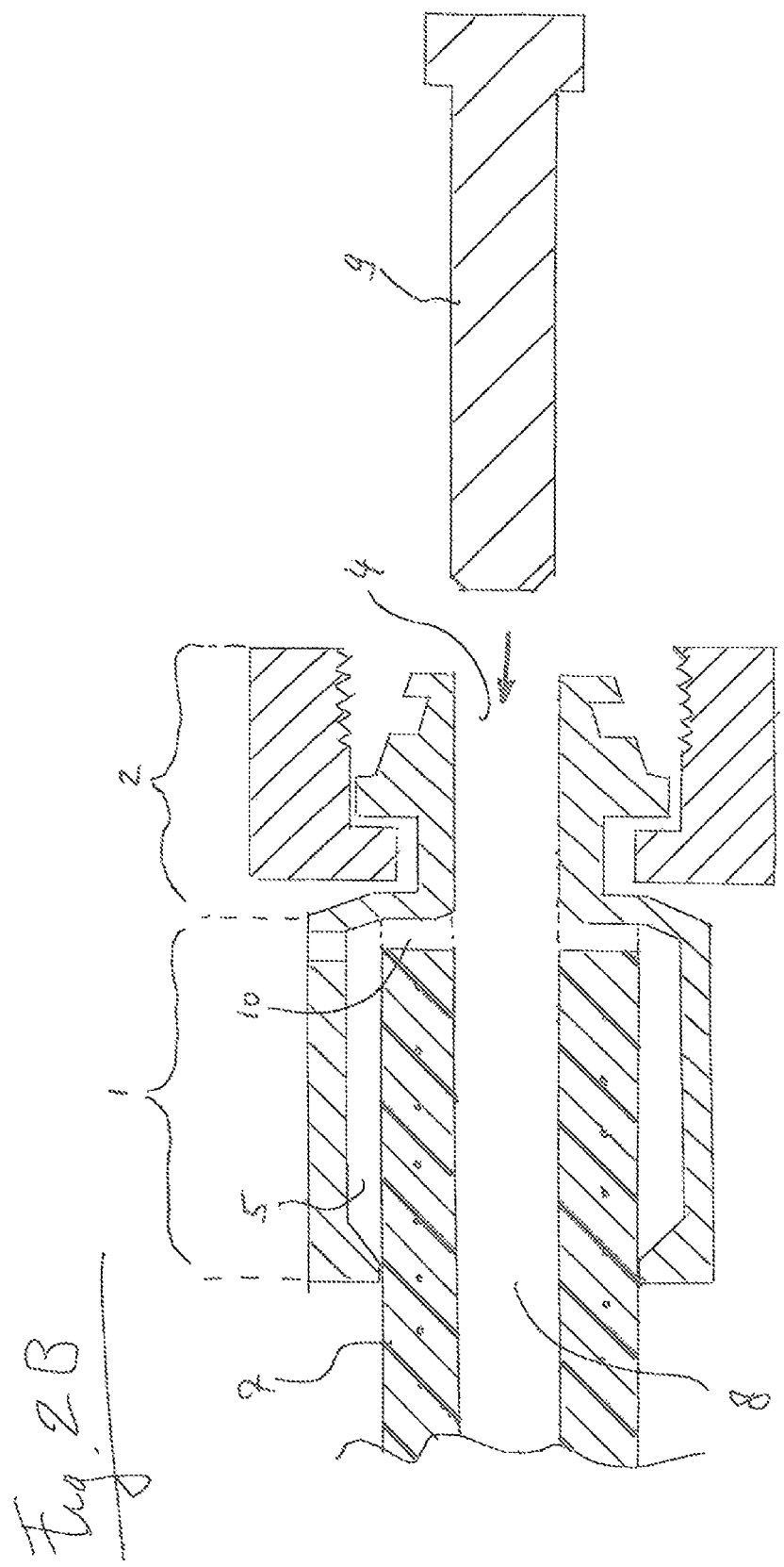

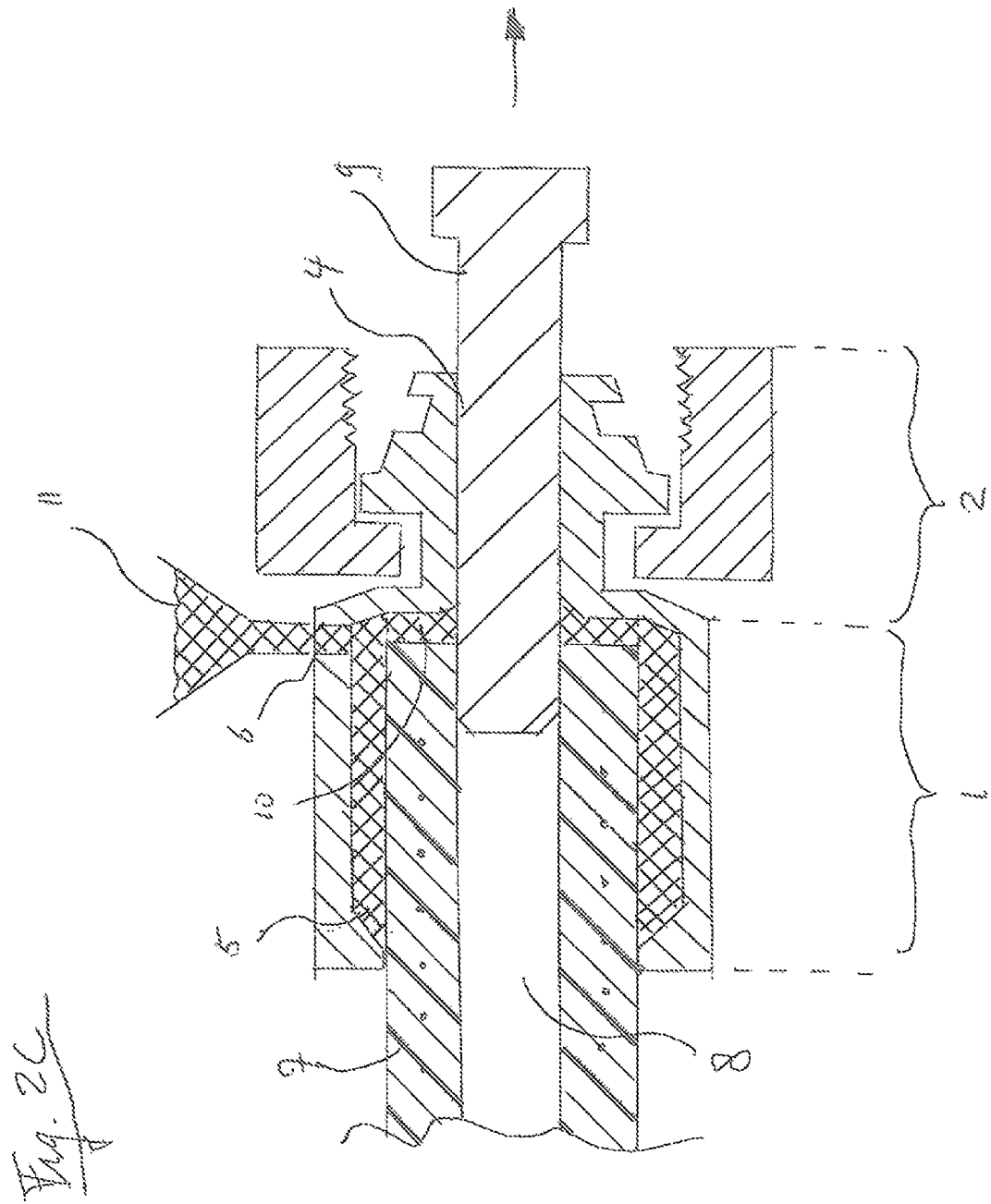

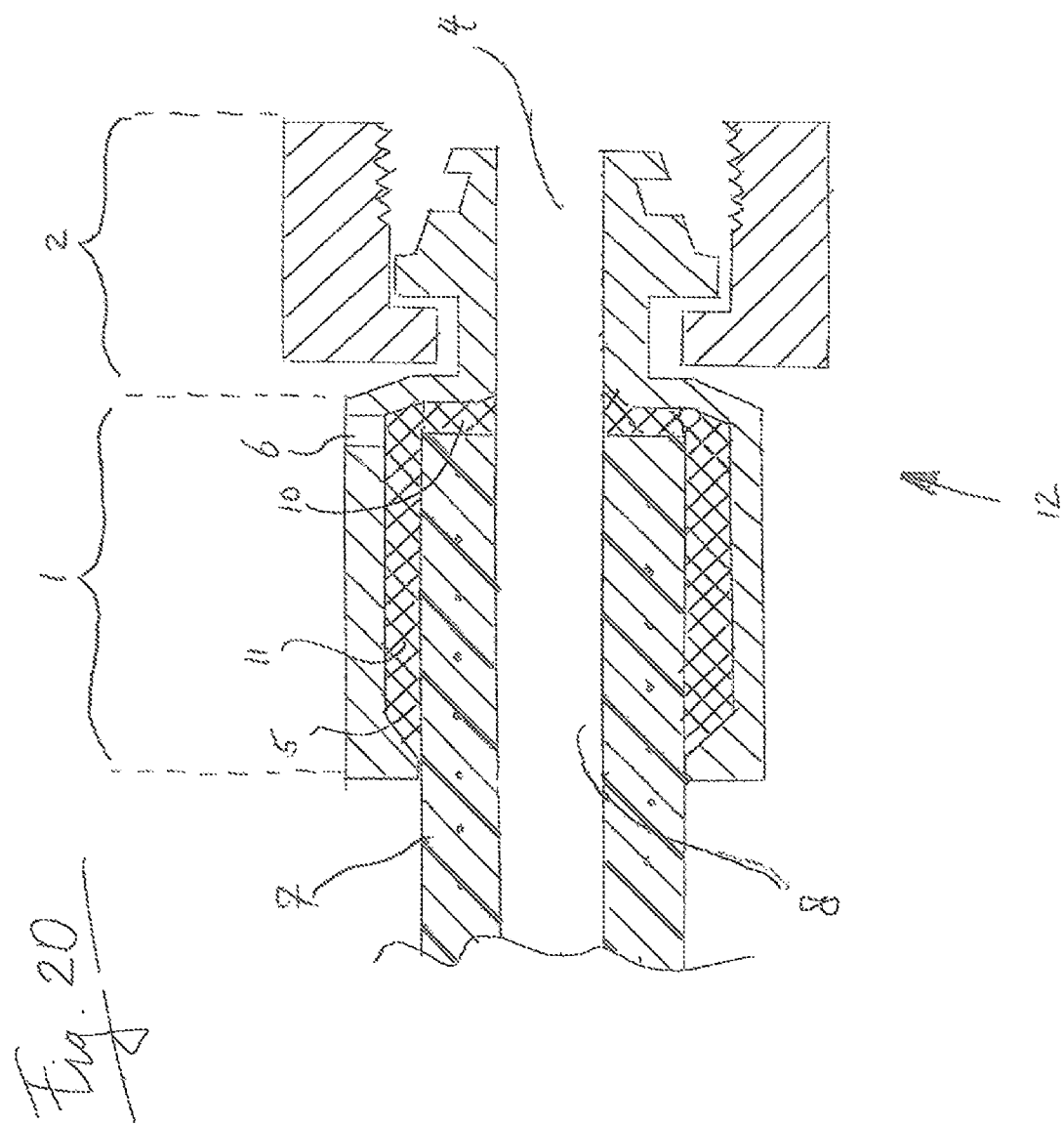

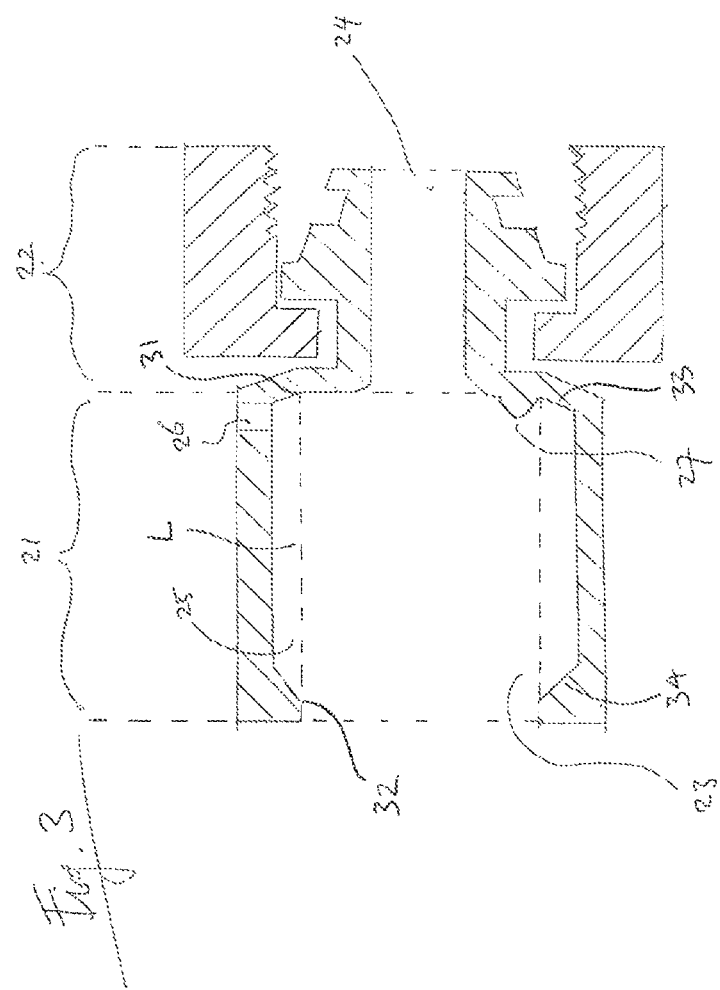

DEVICE FOR CONNECTING A TUBULAR ELEMENT, A COMBINATION OF A DEVICE WITH A TUBULAR ELEMENT AND A BONDING COMPOUND, AS WELL AS A METHOD FOR CONNECTING THE DEVICE WITH A TUBULAR ELEMENT

CROSS-REFERENCE TO PRIOR APPLICATION

Priority is claimed to British Patent Application No. GB 1901014.9, filed on Jan. 25, 2019, the entire disclosure of which is hereby incorporated by reference herein.

FIELD

The present invention provides a device for connecting a tubular element, a combination of a device with a tubular element and a bonding compound, as well as a method for connecting the device with a tubular element.

BACKGROUND

The invention relates to a device for connecting a tubular element, such as a hose or pipe, to another part of a hydraulic or pneumatic system, which device comprises a body having a connection end and a tubular element insertion end, having a cylindrical channel extending from the connection end to the tubular element insertion end, where the connection end serves the purpose of connecting to another part of the hydraulic or pneumatic system, and wherein the cylindrical channel comprises a first part and a second part, wherein the first part is arranged in the tubular element insertion end and wherein the second part is arranged in the connection end.

Typically hydraulic hose fittings are attached by crimping the fitting on the hose in order to create a hose assembly. The deformation of the hose fitting requires special crimping machines which need to apply a high mechanical force to the fitting. Obtaining a consistent deformation without introducing unwanted bending, cracking or fracture is difficult. The tightness of the seal obtained by the depression of the surface of the hose is furthermore determined by the extent to which a consistent depression across the entire circumference of the hose is achieved by the crimping action.

The plastic deformation of the fitting through the crimping action, which is typically only path controlled, can easily result in vulnerabilities of the assembly through reduced wall thickness, fractures or unequal force distribution.

The crimping machines used for attaching a crimp fitting to a hose require crimping dies that correspond with the type of fitting and its diameter. There are a lot of different combinations that need to be accounted for and a new combination of a hose and a fitting often requires a new set of dies as well. This is especially cumbersome in case a fitting needs to be replaced in the field, meaning that a lot of variants of tools have to be brought on site. Also getting proper access to a fitting with the required crimping machines may be rather tedious, especially when replacing a fitting in situ.

Typical crimping hose fittings furthermore support the hose from the inside, in order to achieve a high clamping force between the fitting and the hose. This however introduces a reduction to the internal diameter which has a negative impact on flow characteristics such as for example causing an unwanted pressure drop across the assembly or causing turbulent flow and furthermore induces mechanical stress in the fitting.

Today's fittings are mainly manufactured from metal, because of its great deformation properties which are required for crimping. Alternative materials such as composites like ultra strength polymers or polymer-metal matrices can not easily be applied, even though the alternative materials may introduce other benefits compared to metal.

Attaching an end face structure to a tubular element by applying an adhesive is for example known from WO2012008371.

The passages between the reinforced hose and the sleeve are filled with an adhesive, but the passages are not sealed on the hose end. Forces applied to the hose thus have to be transferred to the sleeve via the adhesive on to the circumferential inner surface of the sleeve only. The force transfer between the adhesive and the sleeve is thus only dependent on the adhesive strength of the adhesive.

SUMMARY

In an embodiment, the present invention provides a device for connecting a tubular element comprising a hose or pipe to a part of a hydraulic or pneumatic system, the device comprising: a body having a connection end and a tubular element insertion end, the body having a cylindrical channel extending from the connection end to the tubular element insertion end, the connection end being configured to connect to the part of the hydraulic or pneumatic system, the cylindrical channel comprising a first part and a second part, the first part being arranged in the tubular element insertion end and the second part being arranged in the connection end, wherein the tubular element insertion end comprises at a middle section a recess extending radially from the first part of the cylindrical channel, along an entire circumference, the recess bordering the second part of the cylindrical channel, and wherein the tubular element insertion end comprises at least one bore connecting the recess with an outer surface of the body.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIGS. 2A-2D shows different steps of an embodiment of the method according to the invention.

FIG. 3 shows a cross-sectional view of a second embodiment of the device according to the invention.

DETAILED DESCRIPTION

Figure 1:
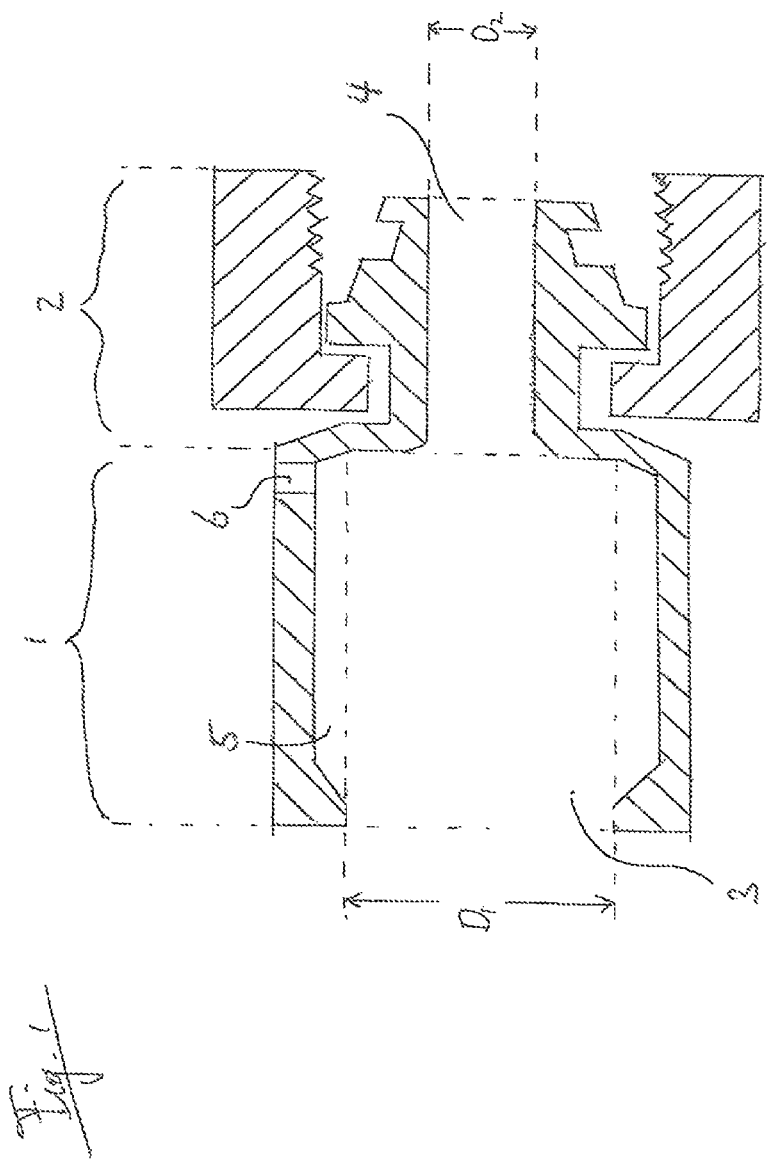
FIG. 1 shows a cross-sectional view of a first embodiment of the device according to the invention.

In an embodiment, the present invention reduces or even removes the above mentioned disadvantages.

In an embodiment, the present invention provides a device which is wherein the tubular element insertion end comprises at a middle section a recess extending radially from the cylindrical channel, along the entire circumference and which recess borders the second part of the cylindrical channel; and in that the tubular element insertion end comprises at least one bore connecting said recess with the outer surface of the body.

By having the recess connected with the outer surface of the body, a means for introducing a bonding compound to the device is provided. This allows a tubular element to be retained by the fitting without crimping, achieving a sealed connection between the tubular element and the fitting through the bonding compound. Such connection can be achieved by simply inserting the tubular element into the tubular element insertion end, and by hermetically sealing the gap between the tubular element, the recess and the second part of the cylindrical channel, before supplying a bonding compound through a bore into the recess. The bonding compound then retains the tubular element and in the same time provides the seal between the tubular element and the device. Forces subjected to the hose are transferred via the bonding compound onto the sleeve both by adhesive strength as well as the shape defined connection of bounding compound and sleeve due to the cavity. This results in a stronger connection between the bonding compound and the sleeve.

In a preferred embodiment of the device, the first part is of larger diameter than the second part of the cylindrical channel and wherein the first part and second part are concentric when viewed in axial direction of the cylindrical channel. By selecting the larger diameter to correspond with the outer diameter of the tubular element and the smaller diameter to correspond to the inner diameter of the tubular element, an assembly can be made which has no restrictions in the inner diameter. Furthermore, such an embodiment allows the tubular element to fully seal the recess. The reduced diameter also acts as a stop to indicate that the tubular element has been inserted sufficiently far.

In another embodiment of the device according to the invention at least one protrusion is arranged in the first part of the cylindrical channel. The protrusion(s) can aid in the positioning of the tubular element in the fitting, so that assembly is simplified even more. The protrusion(s) can also act as a positioning aid, or more specifically a stop, so that the bonding compound can also reach the cut face of the tubular element.

The invention also relates to a combination of a device according to the invention, a tubular element and a bonding compound, wherein the outer diameter of the tubular element corresponds with the inner diameter of the first part of the cylindrical channel and where the tubular element end extends into the middle section comprising the recess and where the recess is filled with a bonding compound.

In another preferred embodiment of the combination according to the invention the inner diameter of the tubular element corresponds with the inner diameter of the second part of the cylindrical channel.

The invention also relates to a method for connecting a device according to the invention with a tubular element, wherein the method comprises the steps of:
providing a tubular element having a tubular channel;
providing a device according to the invention;
inserting the tubular element into the tubular element insertion end and at least partially along the recess;
sealing the recess from the tubular channel and the second part of the cylindrical channel of the device;
providing a bonding compound;
filling the recess supplying the bonding compound via the at least one bore.

With the method according to the invention, a fitting can be easily connected with a tubular element, taking the respective diameters to correspond and by applying the bonding compound to affix and seal connection between the tubular element and the device. The method involves no steps which include a high mechanical force and therefor does not necessitate machines to be used to make the connection. Sealing the tubular channel from the recess can be achieved by inserting a sealing body into the tubular channel or by abutting a sealing body to the annular surface on the end of the tubular element. Furthermore, by skiving the end of the tubular element, e.g. a reinforced hose, a surface can be exposed within the recess that improves the bond between the tubular element and the bonding compound.

The bonding compound can as such also act as a viscoelastic barrier to provide damping and absorb vibrational forces.

The fitting with the recess provides a chemically and mechanically stable setting for applying advanced adhesives or bonding compounds without requiring operators to supply further equipment. This means that operators do not require any specific expertise or equipment to make the combination.

A further embodiment of the method according to the invention further comprises the steps of:
providing a sealing body;
inserting the sealing body into the cylindrical channel sealing the second part of the cylindrical channel;
wherein the sealing body is inserted partially into the tubular channel to seal the tubular channel from the recess. The sealing body simplifies the step in which a proper seal is obtained between the tubular channel, the recess and the second part of the cylindrical channel. This relaxes the requirements on the squareness of the cut of the tubular element and guarantees a continuous passage in the resulting assembly.

FIG. 1 shows a cross-sectional view of a hydraulic hose coupling 1, 2 according to the invention. The body of the coupling has an end 1 for inserting a hydraulic hose and an end 2 for coupling to another part of a hydraulic system. A cylindrical channel 3, 4 extends from the hose insertion end 1 to the coupling end 2. The first part of the cylindrical channel 3 is arranged in the hose insertion end 1 and the second part of the cylindrical channel 4 is arranged in the coupling end 2.

The hose insertion end 1 has a recess 5 and a bore 6 connecting the recess 5 to the outer surface of the coupling.

The first part of the channel 3 has diameter $D_1$ and the second part of the channel 4 has diameter $D_2$ and $D_1$ is larger than $D_2$.

FIGS. 2A-2D show schematically different steps of an embodiment of a method according to the invention.

FIG. 2A shows a hydraulic hose 7 which has an outer diameter $D_3$ and the inside of the hose 8 has diameter $D_4$, a coupling 1, 2 as depicted in FIG. 1 and a mandrel 9 having diameter $D_2$. The diameters $D_1$ and $D_3$ of the first part of the channel 3 respectively the hydraulic hose 7 correspond and the diameters $D_2$ and $D_4$ of the second part of the channel 4 and mandrel 9 respectively the inside of the hose 8 correspond.

The hydraulic hose 7 is being inserted into the hose insertion end 1 in the shown step.

FIG. 2B shows the hose coupling 1, 2 with the hydraulic hose 7 inserted into the hose insertion end 1. The hydraulic hose 7 is inserted partially along the recess 5, leaving a space 10 between the end of the hydraulic hose 7 and the body of the coupling 1, 2.

The mandrel 9 is inserted into the coupling end 2 in the shown step, sealing the inside of the hose 8 from the space 10 and the second part of the channel 4.

FIG. 2C shows the hose coupling 1, 2 with the hydraulic hose 7 inserted. The mandrel 9 is inserted into the second part of the channel 4. The mandrel 9 extends into the inside of the hydraulic hose 8 to seal the inside of the hydraulic hose 8 from the space 10 and thereby from the recess 5 as well. A bonding compound 11 is supplied to the recess 5 as well as to the space 10 through the bore 6 such that the recess 5 as well as the space 10 is filled.

Finally, the mandrel 9 is removed in the shown step.

FIG. 2D shows the obtained combination 12 comprising the hose coupling 1, 2 with the hydraulic hose 7 inserted and where the bonding compound 11 fills the recess 5 and the space 10. An unrestricted and continuous passage is formed by the inside of the hose 8, the bonding compound 11 in the space 10 and the second part of the channel 4.

FIG. 3 shows a cross-sectional view of a second embodiment of a hose coupling 21, 22 according to the invention. The body of the coupling has an end 21 for inserting a hydraulic hose and an end 22 for coupling to another part of a hydraulic system. A cylindrical channel 23, 24 extends from the hose insertion end 21 to the coupling end 22. The first part of the cylindrical channel 23 is arranged in the hose insertion end 21 and the second part of the cylindrical channel 24 is arranged in the coupling end 22. The first part of the cylindrical channel 23 has a length L extending from a first tubular element insertion end 31 abutting the coupling end 22 to a second tubular element insertion end 32 opposite the first tubular element insertion end 31 and configured to receive the hydraulic hose.

The hose insertion end 21 has a recess 25 and a bore 26 connecting the recess 25 to the outer surface of the coupling. The recess 25 extends about an entire circumference of the first part of the cylindrical channel 23 and extends uninterrupted along the length of the first part of the cylindrical channel 23. The recess 25 has a tapered end 33, 34 at each of the first tubular element insertion end 31 and the second tubular element insertion end 32.

A protrusion 27 inside the first part of the channel 23 acts as a depth stop for a hose, ensuring proper insertion depth when a hydraulic hose is combined with the coupling 21, 22.

It will be clear to the person skilled in the art, that the second embodiment of the hose coupling 21, 22 according to the invention can be used in the same way as the hose coupling 1, 2 as shown in FIGS. 1, 2A-2D.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A device for connecting a tubular element comprising a hose or pipe to a part of a hydraulic or pneumatic system, the device comprising:

a body having a connection end and a tubular element insertion end, the body having a cylindrical channel extending from the connection end to the tubular element insertion end, the connection end being configured to connect to the part of the hydraulic or pneumatic system, the cylindrical channel comprising a first part and a second part, the first part being arranged in the tubular element insertion end and having a length extending from a first tubular element insertion end abutting the connection end to a second tubular element insertion end opposite the first tubular element insertion end and configured to receive the tubular element, and the second part being arranged in the connection end, wherein the tubular element insertion end comprises at a middle section a tubular recess extending radially from the first part of the cylindrical channel, the tubular recess extending about an entire circumference of the first part of the cylindrical channel and extending uninterrupted along the length of the first part of the cylindrical channel, the tubular recess having a tapered end at each of the first tubular element insertion end and the second tubular element insertion end, the tubular recess bordering the second part of the cylindrical channel, wherein the tubular element insertion end comprises at least one bore connecting the tubular recess with an outer surface of the body, wherein the device is unitarily constructed, and wherein a space is defined at the first tubular element insertion end below the at least one bore and the tapered end at the first tubular element insertion end, and wherein the tubular recess and the space receive a bonding compound for securing the tubular element to the device.

2. The device according to claim 1, wherein the first part has a larger diameter than the second part of the cylindrical channel, and wherein the first part and second part are concentric when viewed in an axial direction of the cylindrical channel.

3. The device according to claim 2, wherein at least one protrusion is arranged in the first part of the cylindrical channel.

4. A combination, comprising:
   the device according to claim 1;
   the tubular element; and
   a bonding compound,
   wherein an outer diameter of the tubular element corresponds with an inner diameter of the first part of the cylindrical channel,
   wherein the tubular element end extends into the middle section, the middle section comprising the tubular recess, and
   wherein the tubular recess is filled with the bonding compound.

5. The combination according to claim 4, wherein an inner diameter of the tubular element corresponds with an inner diameter of the second part of the cylindrical channel.

6. A method for connecting the device according to claim 1 with a tubular element, the method comprising the steps of:
- providing the tubular element, the tubular element having a tubular channel;
- providing the device;
- inserting the tubular element into the tubular element insertion end and at least partially along the tubular recess;
- sealing the tubular recess from the tubular channel and the second part of the cylindrical channel of the device;
- providing a bonding compound; and
- filling the tubular recess by supplying the bonding compound via the at least one bore.

7. The method according to claim 6, wherein the tubular recess is sealed by inserting the tubular element at least up to the second part of the cylindrical channel.

8. The method according to claim 6, further comprising the steps of:
- providing a sealing body;
- inserting the sealing body into the cylindrical channel sealing the second part of the cylindrical channel, the sealing body being inserted partially into the tubular channel to seal the tubular channel from the tubular recess; and
- after filling the tubular recess with the bonding compound, removing the sealing body from the second part of the cylindrical channel.

\* \* \* \* \*